May 1, 1951  L. VEYRET ET AL  2,551,187
DRAFTING INSTRUMENT
Filed Feb. 26, 1948
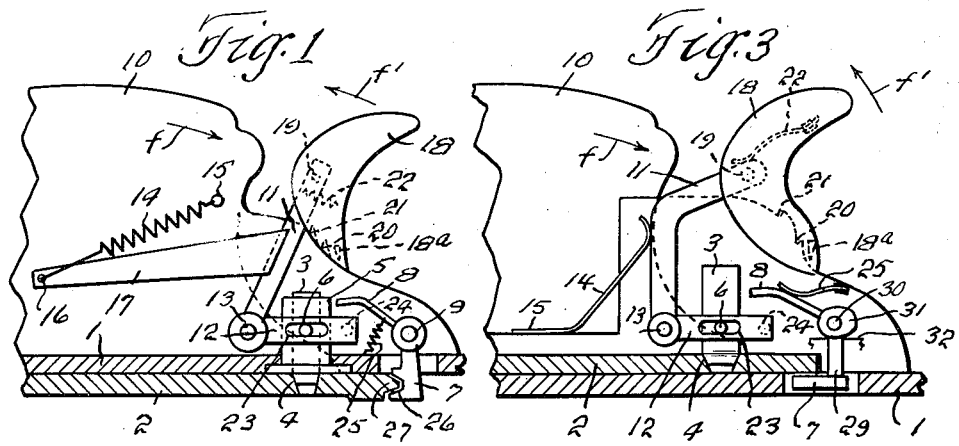
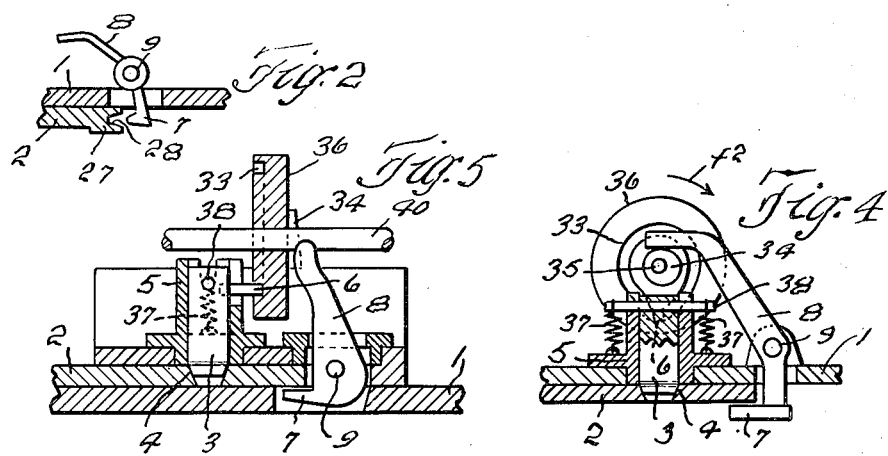
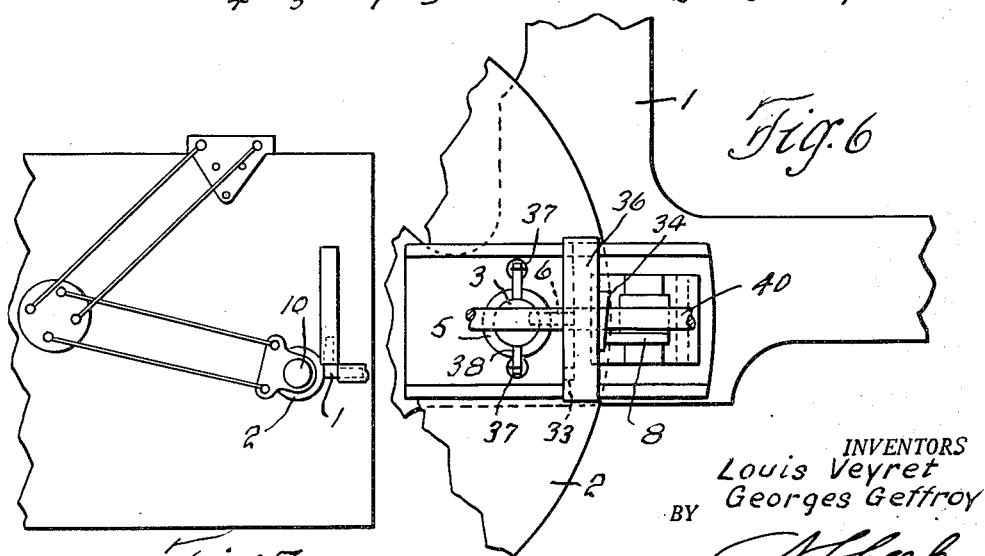
INVENTORS
Louis Veyret
Georges Geffroy
BY
*N. J. Leek*
Atty.

Patented May 1, 1951

2,551,187

UNITED STATES PATENT OFFICE 2,551,187

DRAFTING INSTRUMENT

Louis Veyret, Neuilly-sur-Seine, and Georges Geffroy, Paris, France, assignors to La Cellophane, Paris, France, a French company Application February 26, 1948, Serial No. 11,245
In France June 6, 1945

Section 1, Public Law 690, August 8, 1946
Patent expires June 6, 1965

1 Claim. (Cl. 33—79)

This invention relates to drafting instruments of the type consisting of a head carrying two mutually perpendicular rules and supported in turn by a system of deformable parallelograms, permitting the pair of rules to be displaced parallel to themselves throughout the extent of the drawing board.

An object of the invention is to provide an instrument of the above type in which the rules may be set at various angular positions, and locked in any selected position with respect to their support.

The invention provides a linking arrangement between the system of rules and its deformable support, essentially characterized by comprising a head fixed to the movable support, upon which are arranged, first, a lock consisting of a cylindrical plunger ending in a conical tip engaging conical depressions in the support, and, second, a brake consisting of a movable shoe which may be clamped against the edge of the support, the lock and brake being operated by means of a lever or knob which may occupy any of three positions, corresponding successively and respectively to (1) engagement of the lock in a hole with the brake off; (2) disengagement of the lock with the brake off; and (3) application of the brake with the lock disengaged.

Further features of the invention will appear from the following description, taken in connection with the accompanying drawings, in which certain specific embodiments are set forth by way of example.

In the drawings:

Fig. 1 is a sectional view of one form of device embodying the present invention;

Fig. 2 is a detail view of one form of brake shoe;

Fig. 3 is a sectional view similar to Fig. 1 of a modified form of device embodying the invention;

Fig. 4 is a sectional view, similar to Fig. 1, of a further modified form of the device;

Fig. 5 is a sectional view, similar to Fig. 1, of another modified form of the device;

Fig. 6 is a top plan view of the device of Fig. 5; and

Fig. 7 is a diagrammatic view showing the relationship of the instrument to a drawing board.

In reference to the drawings and figures as a whole, I designates the movable system of rules which are to be adjusted and set with respect to a movable support or fixed portion 2, carried by the usual parallelogram links as shown in Fig. 7. A locking plunger 3 ends in a conical tip received by the conical openings 4 in the support 2 at equal distances along the circumference of a circle with center at the axis of rotation of the movable system 1 with respect to the support 2. The plunger 3 slides in a bearing 5 fixed to the movable portion 1, and its upper portion is provided with pins 6 cooperating with the operating mechanism to be described. A brake shoe 7 engages the peripheral edge of the support 2, and is operated by a lever 8 pivoted on a pin fixed in the movable portion 1.

In Fig. 1, the assembly of the operating mechanism is mounted on a head 10 fixed to the movable portion 1, which in turn is placed above the support 2, such operating mechanism comprising a lever with two arms 11 and 12 swiveling on a pivot 13 in the head 10, and constantly restrained in the direction of the arrow $f$ by a spring 14 hooked at 15 to the head 10 and at 16 to the end of a bar 17 fixed to the arm 11. At its free end, the arm 11 carries an indented pawl 18 pivoted at 19, carrying a dog 18a which may engage two notches 20 and 21 on the head 10, towards which it is urged by a spring 22.

The arm 12 carries a slot 23 receiving the pin 6 of the locking plunger 3. At its extremity, the arm 12 carries a projection 24 which may make contact with the operating lever 8 of the brake. This lever 8 is restrained by a spring 25 and is fixed to the shoe 7, the shoe 7 and the lever 8 together forming a lever pivoted on the shaft 9. The shoe 7 has a lateral gap with oblique walls 26 to receive the edge 27 of the support 2.

In the form of Fig. 2, it is conversely the edge 27 which contains an oblique groove 28 to receive the end of the shoe 7.

The device operates as follows:

In the position shown in Fig. 1, the plunger 3 is held in one of the holes 4 by the action of the spring 14, and the shoe 7 is held in "off" position by the spring 25, thus being disengaged. The movable portion 1 is thus locked on the support 2 in a definite position by the plunger 3 in the hole 4. If it is desired to release the movable portion 1, the pressure of the finger is applied to the piece 18 in the direction of the arrow $f^1$, thus engaging it in the notch 20. The arm 12, in turning about the pivot 13, lifts the plunger 3 by its pin 6, which moves in the slot 23. The plunger 3 is thus disengaged from the hole 4, with the shoe 7 still disengaged, and the movable portion is left free. If, after displacement of the movable portion 1 to a position somewhere between two holes 4, it is then desired to lock it in this position, the part 18 is pushed still further in the direction of the arrow $f^1$ until it engages the notch 21. In this motion, the arm 12 makes contact with the lever 8 through the spur 24, so that the lever pivots about the shaft 9 and actuates the shoe 7, which in turn clamps against the edge 27 of the support 2.

The lock 3, having continued to rise, is still disengaged, and the movable portion 1 is thus held to the support 2 solely by the friction of the brake 7.

In Fig. 3, the movable portion 1 is placed under the support 2, which is surmounted by the overhanging head 10. The spring 14 acts directly on the arm 11 of the operating lever, and the shoe 7 consists of a simple horizontal clip which may come into contact with the lower surface of the edge of the support 2. This clip is fixed to a vertical rod 29 connected by a pin 30 to a cam 31 rigidly connected to the lever 8, and bearing on a fixed shoulder 32, in such a manner that a rotation of the lever 8 causes the cam 31 to rise, thus lifting the rod 29.

The operation of this device is the same as in that of Fig. 1.

In Fig. 4, the two-armed lever 11, 12 is replaced by a double rotating cam comprising an internal cam 33 engaging the pin 6 of the plunger 3, and a solid cam 34 engaging the free end of the operating lever 8 of the brake 7. These two cams 33 and 34 are rigidly placed at 90° to one another, and brought into rotation about a horizontal shaft 35 by a knob 36.

The plunger 3 is resiliently held downwards by two springs 37 attached to the base of the bearing 5 at one end and at the other end to a pin 38 attached to the plunger 3, which moves in two vertical slots in the bearing 5.

The brake shoe consists of a simple horizontal clip 7 fixed to the lever 8, with which it forms a two-armed lever pivoting about the shaft 9. This brake shoe may be brought in contact at its upper surface with the lower surface of the edge of the support 2.

When the assembly is in the locked position of Fig. 4, and the knob 36 is turned in the direction of the arrow $f^2$, the plunger 3 is drawn up by the pin 6 and frees the movable portion 1, the lever 8 remaining on a circular portion of the cam 34, so that the brake 7 remains disengaged.

To apply this brake, the knob 36 is turned further in the same direction so that the cam 34 raises the lever 8, while the pin 6 is held in top position in a circular portion of the cam 35.

The arrangement represented in Figs. 5 and 6 is analogous to that in Fig. 4, with the difference that the shaft 40 upon which the knob 36 revolves is perpendicular to the shaft 9 of the lever 8, instead of parallel to it. The free end of the lever 8, instead of engaging the periphery of the cam 34, engages the face of this cam, whose form is such as to produce the desired displacement of the lever 8. On the other hand, as in the case of Fig. 3, the support 2 is located above the movable portion 1.

The operation is the same as for Fig. 4.

Naturally, the invention is by no means limited to the forms illustrated and described, these embodiments having been selected by way of example only. The invention is only to be restricted in accordance with the scope of the following claim.

What is claimed is:

In a drawing instrument of the type comprising a head carrying a rule and a movable support therefor, means pivotally mounting said head for rotation on said support, locking means for said head comprising a plunger and cooperating recesses carried by the head and support for locking said head in selected angular position, a lever pivoted to said head and having an arm connected to lift said plunger and a second arm extending upwardly, spring means holding said lever and plunger in locking position, a pawl on said second arm, said head having a surface over which said pawl slides when said second lever is actuated toward release position, said surface having a notch to receive said pawl in plunger-releasing position, said pawl being pivoted to said second arm for manual release for restoring said lever and plunger to locking position, a second lever pivoted to said head and having an arm carrying a brake shoe positioned to engage a surface of said support and having a second arm extending over the first arm of said first lever, but normally out of engagement therewith, said first arm being arranged to engage and actuate said second lever and apply said brake upon further actuation of said first lever beyond said plunger-releasing position, said surface having a second notch positioned to receive and hold said pawl in braking position whereby movement of said first lever plunger and further movement of said lever in the same direction applies said brake.

LOUIS VEYRET.
GEORGES GEFFROY.

REFERENCES CITED

The following references are of record in the file of this patent:

UNITED STATES PATENTS

| Number | Name | Date |
| --- | --- | --- |
| 1,408,252 | Bieuville | Feb. 28, 1922 |
| 2,394,344 | Wallace | Feb. 4, 1946 |
| 2,400,733 | Baker | May 21, 1946 |

FOREIGN PATENTS

| Number | Country | Date |
| --- | --- | --- |
| 424,161 | Germany | Jan. 21, 1926 |
| 486,471 | Germany | Nov. 18, 1929 |
| 575,169 | Germany | Apr. 25, 1933 |